Feb. 17, 1959   J. D. LESLIE ET AL   2,873,794
INERTIA LATCH
Filed Sept. 24, 1956   6 Sheets-Sheet 3

INVENTORS
James D. Leslie &
Henry J. Wubbe
BY
Paul Fitzpatrick
ATTORNEY

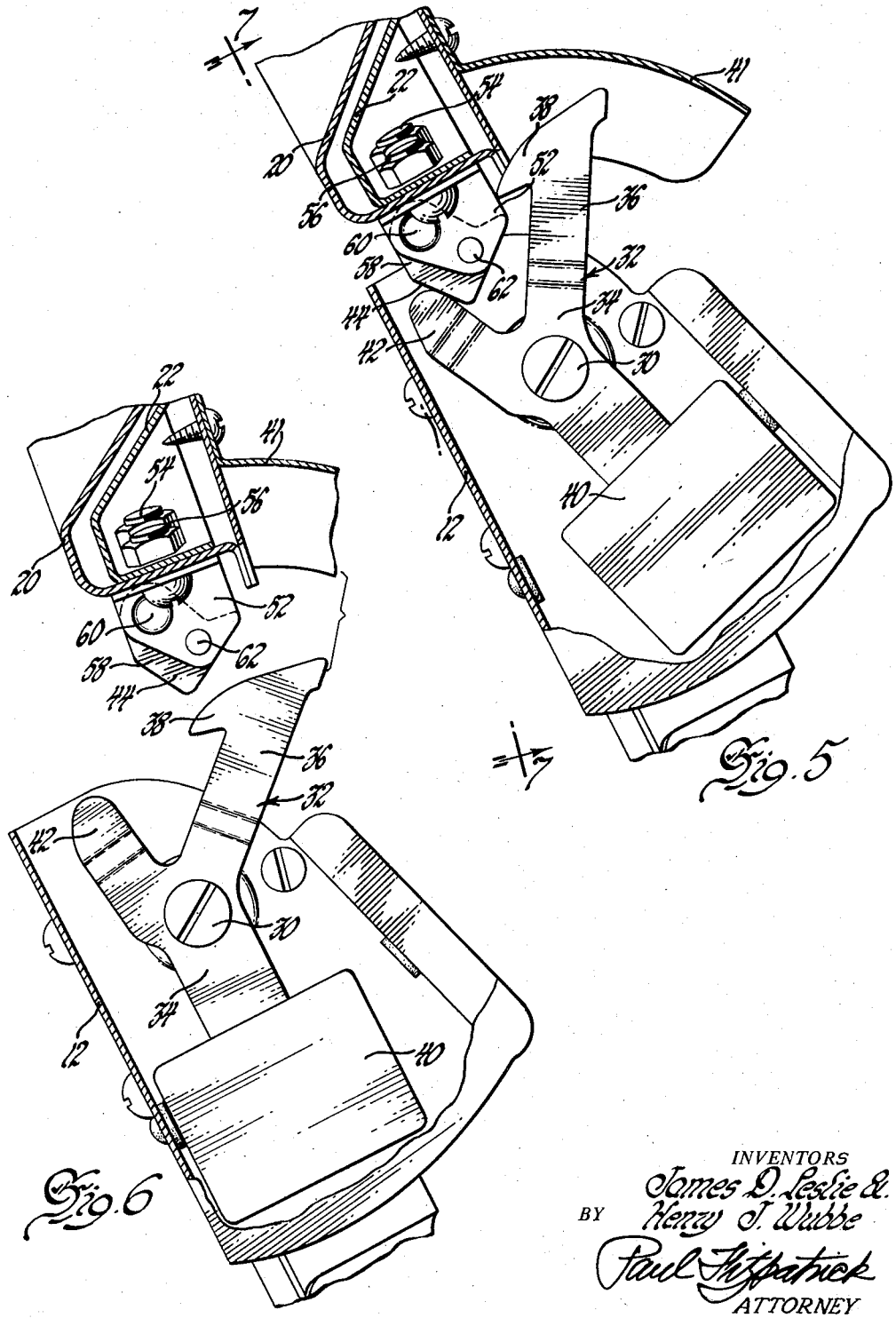

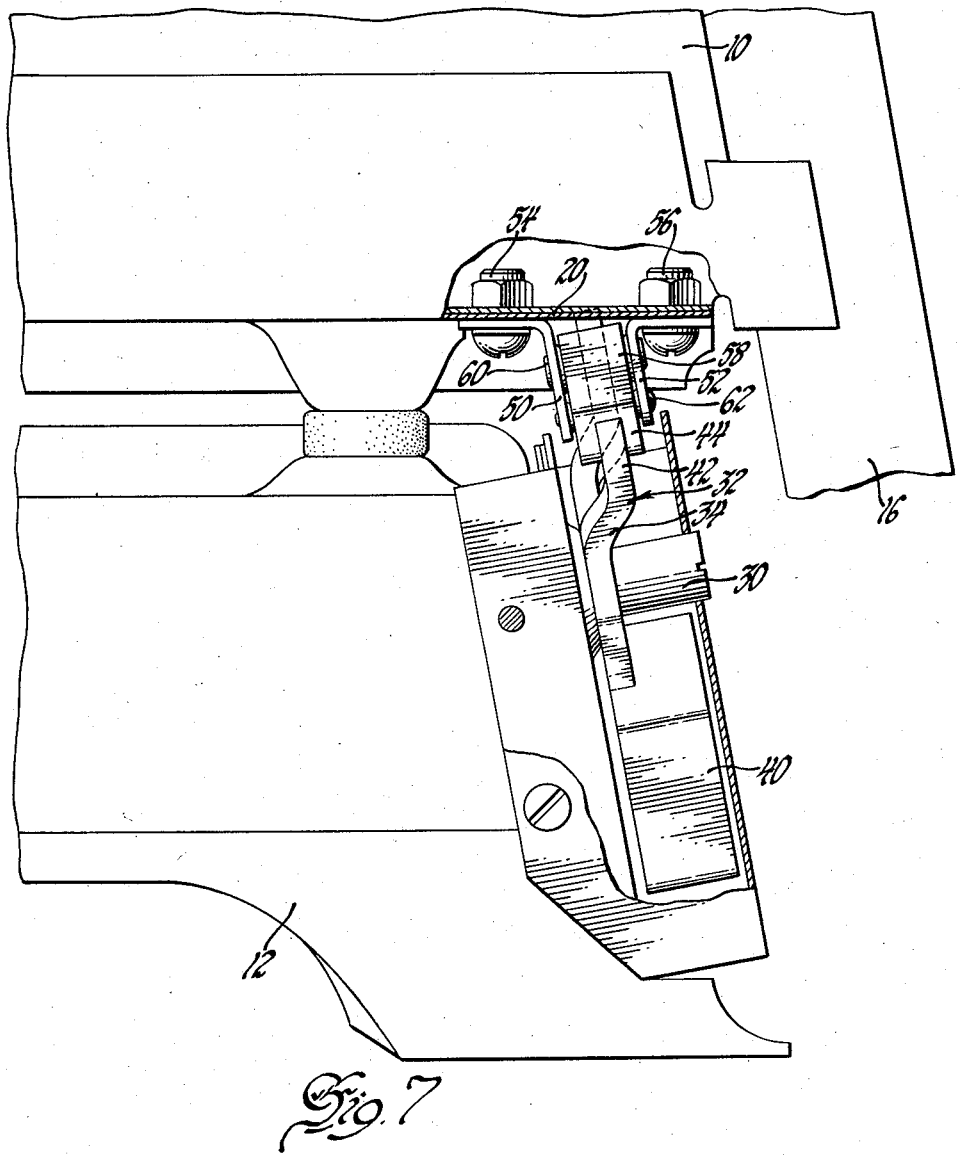

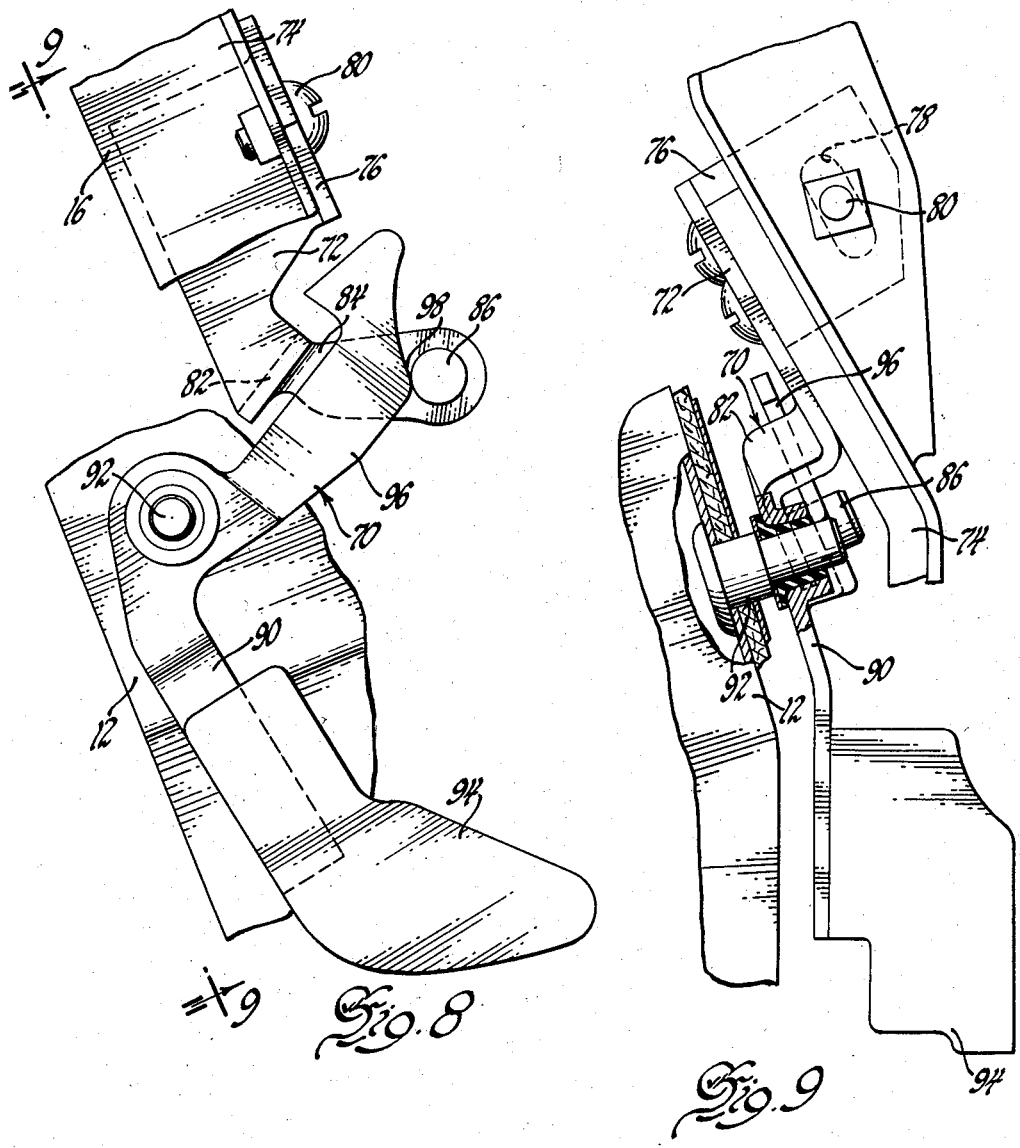

United States Patent Office 2,873,794
Patented Feb. 17, 1959

2,873,794
INERTIA LATCH

James D. Leslie, Birmingham, and Henry J. Wubbe, Royal Oak, Mich., assignors to General Motors Corporation, Detroit, Mich., a corporation of Delaware Application September 24, 1956, Serial No. 611,551

9 Claims. (Cl. 155—155)

This invention relates to vehicle seats, and more particularly to latching mechanisms for seats having tiltable seat backs.

One feature of the invention is that it provides an improved seating arrangement; another feature of the invention is that it provides an improved inertia latching arrangement for tiltable seat backs; a further feature of the invention is that it provides an inertia latch for tiltable seat backs comprising a latch pendulum which, in its free suspended position, is inoperative, lying outside the path of movement of a catch on the seat back but which normally is held out of its free suspended position in an operative position for engagement with said catch upon tilting of the seat back; still a further feature of the invention is that it provides an inertia operated pendulum type latch which moves under gravity bias to an inoperative position upon slow tilting movement of the seat back but which moves under inertia forces into engagement with a catch on the seat back in response to rapid tilting of the seat back during rapid deceleration of the vehicle; and still another feature of the invention is that in one embodiment it provides a shearable catch on the striker to prevent bending the seat frame.

Other features and advantages of the invention will be apparent from the following description and from the drawings, in which:

Fig. 5 is a fragmentary section showing a modified form of the invention;

Fig. 6 is a view similar to Fig. 5 but with the parts in a different position;

Fig. 7 is a rear view taken along the line 7—7 of Fig. 5;

Fig. 8 is a fragmentary view showing a third form of the invention; and

Fig. 9 is a rear view taken along the line 9—9 of Fig. 8.

Figure 1:
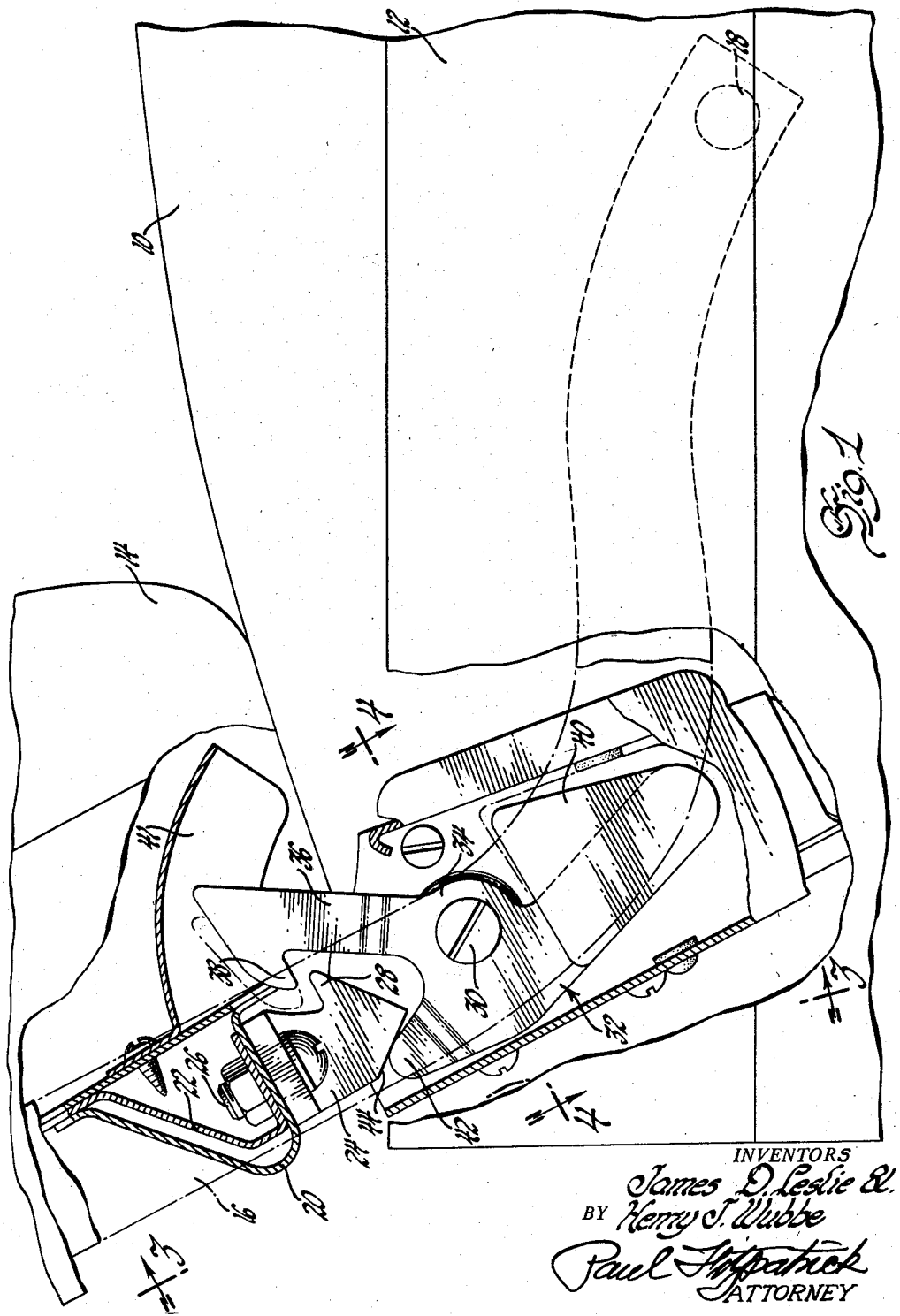
Fig. 1 is a fragmentary side elevation, partly in section, of an automobile seat cushion and seat back incorporating one form of the invention, the latch being shown in solid lines in normal operative position and in broken lines in active latching position.

In conventional two-door automobiles the front seat back is tiltable to provide ease of entrance and exit to the rear passenger compartment. The seat back may be a unitary structure extending entirely across the vehicle or may be split into separate driver's and passenger's seat backs as is usually the case. Because of the hinged mounting employed on these tilting seat backs, they have a tendency to tilt forward over the seat cushion when the vehicle is decelerated rapidly. Furthermore, passengers or luggage in the rear passenger compartment may be thrown against the front seat back in the event of a sudden stop.

It has been proposed in the past to latch the seat back against tilting movement either by a manual or door operated device or by an inertia operated device such as shown in the patent to Semar entitled "Seat Construction" which issued on March 6, 1956 as Patent No. 2,737,229 and in the patent to Williams entitled "Inertia Lock for Tilting Auto Seats" which issued on January 24, 1956 as Patent No. 2,732,003. In the Semar and Williams structures, an inertia latch is freely suspended so that normally it is out of the path of the striker carried by the seat back to permit the seat back to be tilted relatively slowly, as when it is desired to provide ease of access to the rear passenger compartment. In the event of sudden deceleration, the latch must swing under inertia forces from its inoperative free suspended position to an operative position in the path of the striker before the striker swings past the latch as the seat back tilts.

The present invention provides an improvement over this structure, wherein the latch is normally held against gravity in an operative position in the path of swinging movement of the striker. When the seat back is tilted relatively slowly to provide access to the rear passenger compartment, the latch moves under the force of gravity to an inoperative position to permit such tilting movement. At this time the vehicle is not decelerating and there are no inertia forces acting on the latch. However, in the event of sudden deceleration, it is not necessary for the latch to swing from an inoperative position to an operative position to assure engagement with the striker. Inertia forces need only hold the latch in its operative position and not permit the latch to swing to its inoperative position. Since the latch is normally held in an operative position, there is no chance that the striker can swing past the latch as the seat back tilts before the latch can move under inertia forces to its operative position.

Referring to the embodiment of the invention illustrated in Figs. 1 through 4 of the drawings, an automobile front seat cushion 10 is mounted in conventional and well known manner in a seat frame 12. A tilting seat back 14 is hingedly mounted on the frame 12 in the usual manner, only the outside mounting being shown in the drawings. The back cushion is carried on a frame having an outside hinge arm 16 which is pivoted at 18 to the seat frame 12. As is well understood in the art, a similar type of hinging device is employed at the other side of the seat back. When a unitary seat back is used, this other hinge is at the opposite side of the vehicle, and when a split seat back is used, the other hinge is adjacent the longitudinal center of the vehicle.

A striker mounting bracket 20, which is backed by a reinforcing member 22, is secured to the seat back frame by welding or other conventional means and a striker 24 is mounted by bolts 26 on the bracket. The striker has an integral catch portion 28 which projects downwardly for engagement with the latch.

The seat cushion frame 12 carries a stud 30 which forms a pivotal mounting for a pendulum type latch designated generally as 32. The latch has a body portion 34 which pivots intermediate its ends on the stud 30 and an upwardly extending projection 36 on the latch body terminates in a latching hook 38. At the lower end of the body, there is secured by rivets or any other conventional means a weight 40. A guard 41 is mounted on the seat back frame above the latch.

Figure 2:
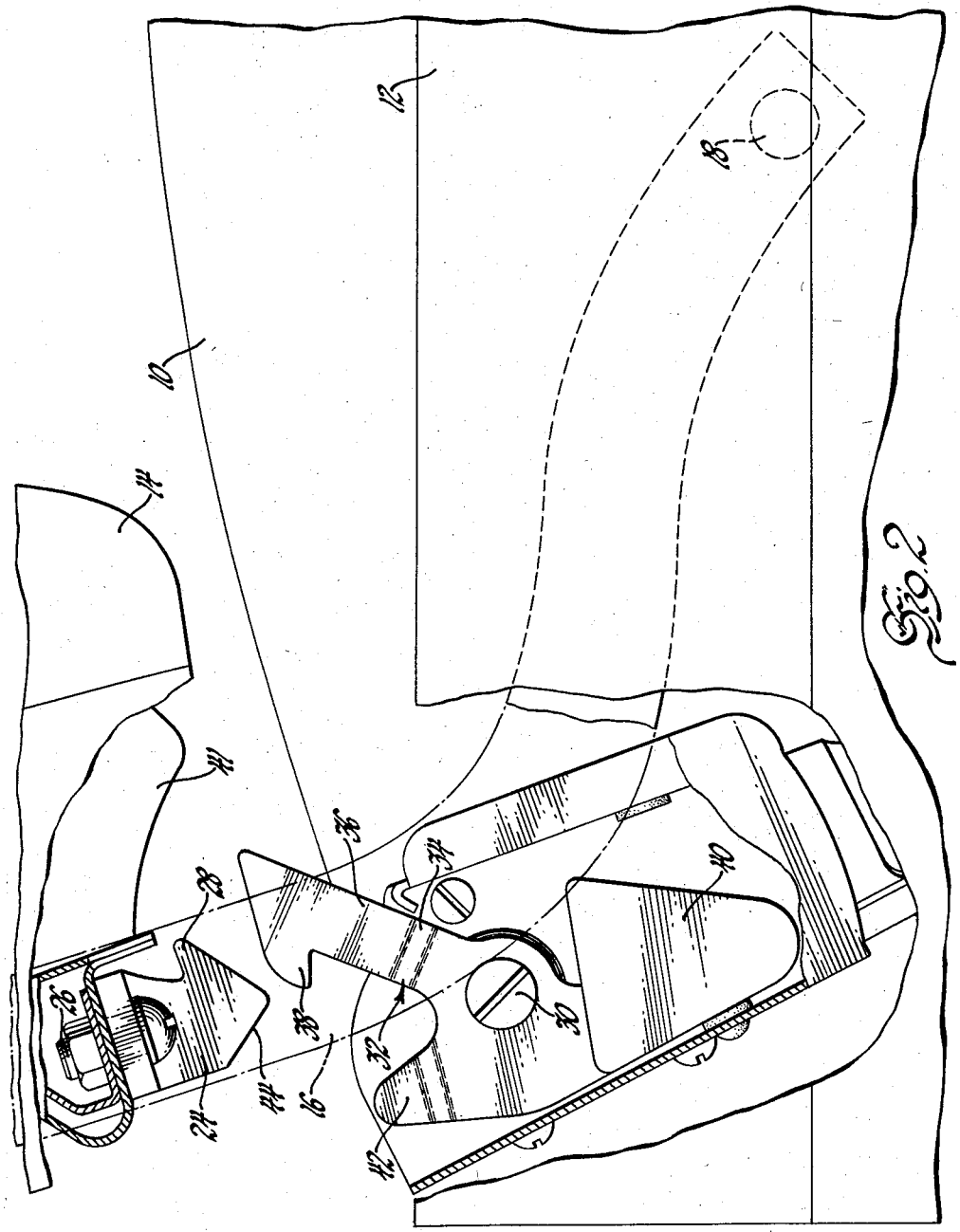
Fig. 2 is a view similar to Fig. 1 but with the parts in a different position.
Figure 3:
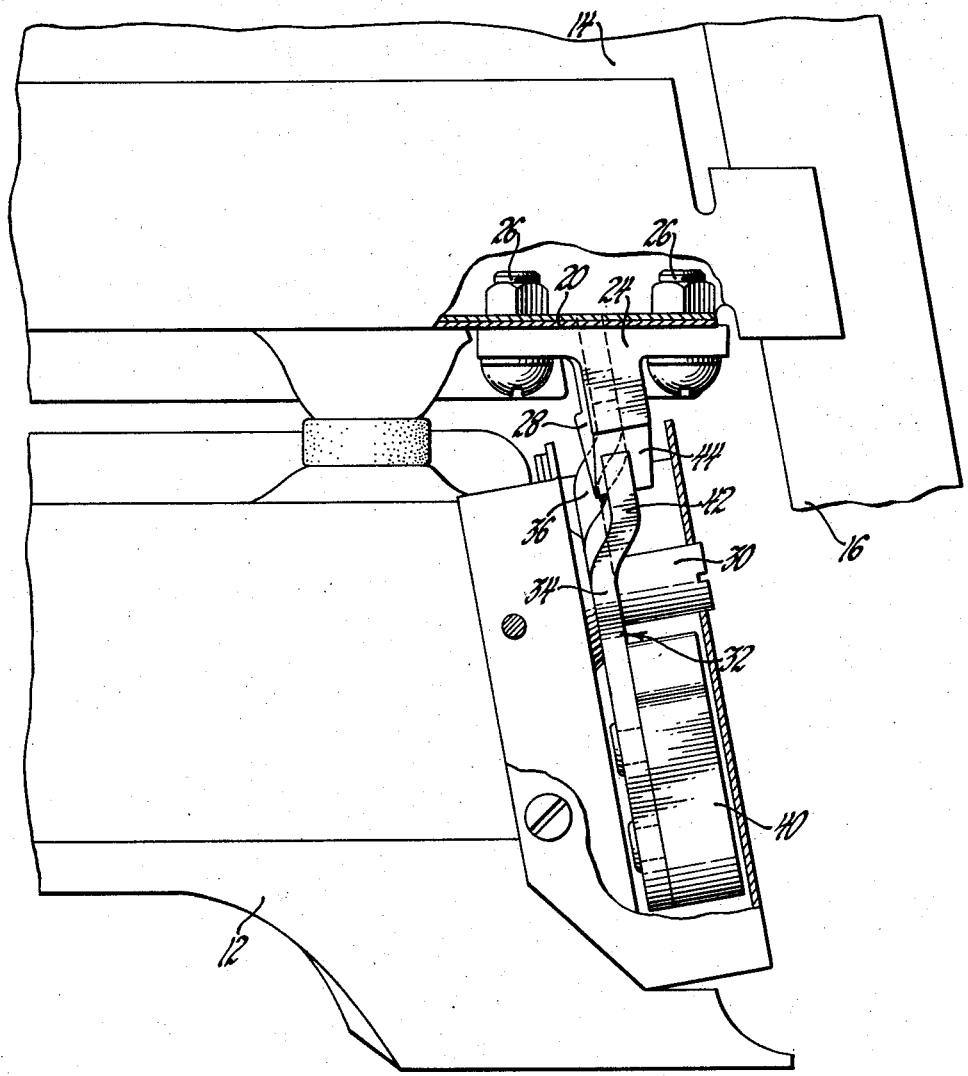
Fig. 3 is a rear view, partly in section, taken along the line 3—3 of Fig. 1.
Figure 4:
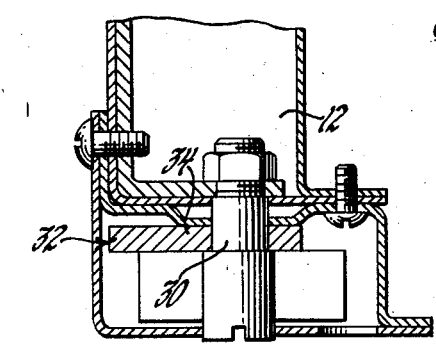
Fig. 4 is a detail section taken along the line 4—4 of Fig. 1.

Fig. 1 illustrates in solid lines the normal position of the latch when the seat back is in its normal upright position. With the parts as shown in Fig. 1, the latch is not allowed to rest in a freely suspended position toward which it is gravity biased by the weight 40. An abutment 42 which projects from the latch body engages an abutment shoulder 44 on the striker to hold the pendulum latch away from its freely suspended position and in an operating position wherein the latch hook 38 lies in the path of swinging movement of the striker when the seat back is tilted. In the event of rapid deceleration of the vehicle, the seat back will swing by inertia in a direction clockwise about the pivot 18 as illustrated in Fig. 2, swinging the striker catch 28 into engagement with the latch hook and preventing tilting movement of the seat back. This latching engagement is aided by the fact that during deceleration inertia forces will swing the weight 40 counterclockwise about the pivot 30, thus swinging the latch hook 38 into more direct engagement with the striker catch 28 as illustrated in broken lines in Fig. 1. Since the latch normally is held out of its free suspended position and in an operative position in the path of movement of the striker, there is no chance whatsoever that the seat back will tilt forwardly before the latch can swing under the force of inertia into an operative position.

Fig. 2 illustrates the position of the parts when the seat back is being tilted forwardly to provide access to the rear passenger compartment. Under inertia forces of rapid deceleration of the vehicle, the seat back swings rapidly so that the latch does not have an opportunity to move clockwise into its freely suspended inoperative position. Furthermore, when the vehicle decelerates, inertia forces acting on the weight 40 prevent the latch from swinging in a clockwise direction, but on the contrary swing the latch in a counterclockwise direction into more direct engagement with the striker catch as explained above. However, when the vehicle is not rapidly decelerating and the seat back is tilted relatively slowly by hand, moving the abutment shoulder 44 away from the latch abutment 42, the latch will move under the force of gravity to a freely suspended position as shown in Fig. 2 where it is out of the path of movement of the striker catch and where it permits the seat back to swing freely forwardly. When the seat back is swung back to the position of Fig. 1, the abutment surface 44 on the striker picks up the latch abutment projection 42 shortly before the seat back reaches its normal upright position so that the last increment of movement of the seat back cams the latch in a counterclockwise direction to its operative position of Fig. 1.

Figs. 5, 6 and 7 illustrate a modification of the invention in which the striker catch is not an integral portion of the striker but is a separate member shearably mounted on the striker. In this embodiment, the latch is similar in structure and operation to the latch of the embodiment of Figs. 1–4, although the latch and its pendulum weight are shown as being of somewhat different shape. The striker is not formed with an integral catch portion as the portion 28 of Figs. 1–4. Instead, the body of the striker comprises a pair of oppositely facing L-shaped brackets 50, 52 which are bolted to the support brackets 20, 22 by bolts 54, 56, respectively. A separate striker catch 58 is pivotally suspended between the brackets 50, 52 on a pivot stud 60 and is held in the operative position shown by a shearable pin 62 which may be made of annealed brass. This construction is designed to take all normal inertia forces which will not bend the seat frame. However, in the event of the application of excessive force in an amount which would bend the seat frame, the pin 62 is designed to shear so that the catch 58 may swing in a clockwise direction about the pivot stud 60 and free the latch.

Figs. 8 and 9 show a third modification of the invention. In this form, the striker, which is designated generally as 70, comprises a Z-shaped plate having an upper mounting portion 72 secured to an extension 74 projecting from the seat back frame. A right angle flange 76 on the mounting portion 72 of the striker has a slot 78 for receiving a screw 80 extending into the seat back frame. This provides an adjustment means for the vertical position of the striker. A horizontal latching portion 82 is bent in the striker, which then terminates in a downwardly projecting camming portion 84 upon which is mounted an abutment stud 86.

The latch, while different in shape, is similar in function to the latch of the previously described embodiments. The latch body 90 is pivoted on a stud 92 on the seat cushion frame and a weight 94 is mounted on the lower end of the body. The latching projection 96 projects forwardly and upwardly from the body for engagement with the latching portion 82 of the striker. An abutment or camming shoulder 98 on the latch rides on the abutment stud 86 when the parts are in their normal position. Thus, the abutment stud 86 in cooperation with the abutment shoulder 98 holds the latch out of its freely suspended position and in an operative position in the path of movement of the striker catch 82 when the seat back is tilted. The operation of the embodiment of Figs. 8 and 9 is similar to the operation of the embodiment of the invention illustrated in Figs. 1 to 4.

While we have shown and described certain embodiments of our invention, it is capable of many modifications. Changes, therefore, in the construction and arrangement may be made without departing from the spirit and scope of the invention as set forth in the appended claims.

We claim:

1. In a vehicle, a seat comprising a cushion base member and a tiltable back member pivotally mounted on said cushion base member; a striker mounted on one of said members; a latch movably mounted on the other of said members; means biasing said latch toward an inoperative position out of engagement with said striker upon tilting movement of said back member; and means normally holding said latch in an operative position for latching engagement with said striker upon rapid tilting movement of said back member.

2. Apparatus of the character claimed in claim 1, wherein said last mentioned means comprises cooperating abutment portions on said latch and striker.

3. In a vehicle, a seat comprising a cushion base member and a tiltable back member pivotally mounted on said cushion base member; a striker fixedly mounted on one of said members; a latch swingably mounted on the other of said members; means biasing said latch toward an inoperative position out of engagement with said striker upon tilting movement of said back member; and means on said striker normally holding said latch in an operative position for latching engagement with said striker upon rapid tilting movement of said back member, said latch being mounted so that inertia forces which cause the seat back to tilt and swing the striker toward the latch also cause the latch to swing against the force of said bias toward said striker.

4. In a vehicle, a seat comprising a cushion base member and a tiltable back member pivotally mounted on said cushion base member; a striker fixedly mounted on one of said members; a latch movably mounted on the other of said members, said latch comprising a body portion pivotally mounted intermediate its ends and having a latching portion adjacent one end and a weighted portion adjacent the other end for gravity biasing the latching portion toward an inoperative position out of engagement with said striker upon tilting movement of said back member; and complementary abutments on said latch and striker normally holding said latch in an operative position against the force of gravity for latching engagement with said striker upon rapid tilting movement of said back member.

5. In a vehicle, a seat comprising a cushion base member and a tiltable back member pivotally mounted on said cushion base member; a striker fixedly mounted on said back member; a latch swingably mounted on said base member; gravity bias means on said latch biasing said latch toward an inoperative position out of the path of movement of said striker upon tilting movement of said back member; and complementary abutments on said latch and striker normally holding said latch in an operative position for latching engagement with said striker upon rapid tilting movement of said back member, the gravity bias means swinging said latch out of the path of movement of said striker upon slow tilting movement of said seat back.

6. Apparatus of the character claimed in claim 5, wherein said latch comprises a body pivotally mounted intermediate its ends on said base member and having a projecting latching portion at one end and a biasing weight at the other end, said latch body having a camming projection intermediate its ends extending towards the striker for abutment therewith to hold the latch in its inoperative position when the back member is in an upright position.

7. In a vehicle, a seat comprising a cushion base member and a tiltable back member pivotally mounted on said cushion base member; a striker mounted on one of said members, said striker having a movably mounted catch and shearable means for holding said catch in an operative position, said shearable means comprising a pin constructed to shear and cause said catch to move out of engagement with said latch upon the exertion of a predetermined force by said latch on said striker; a latch movably mounted on the other of said members; means providing a yieldable force urging said latch toward an inoperative position out of engagement with said catch upon tilting movement of said back member; and means normally positively holding said latch in an operative position against said yieldable force for latching engagement with said catch upon tilting movement of said back member.

8. In a vehicle, a seat comprising a cushion base member and a tiltable back member pivotally mounted on said cushion base member; a striker mounted on one of said members, said striker having a movably mounted catch and shearable means comprising a soft metal member holding said catch in an operative position; and a latch mounted on the other of said members engageable with said catch in response to deceleration of said vehicle for preventing tilting movement of said back member.

9. In seat latching means, a striker comprising at least one bracket mounted on said seat; a catch member pivotally mounted on said bracket; and shearable means comprising a soft metal pin spaced from said pivot and connecting said catch to said bracket.

References Cited in the file of this patent
UNITED STATES PATENTS

| | | |
|---|---|---|
| 412,617 | Hogan | Oct. 8, 1889 |
| 2,559,548 | Seigneur | July 3, 1951 |
| 2,732,003 | Williams | Jan. 24, 1956 |
| 2,737,229 | Semar | Mar. 6, 1956 |